(12) United States Patent
Pellegrini

(10) Patent No.: US 8,153,224 B2
(45) Date of Patent: Apr. 10, 2012

(54) PROCESS FOR CONNECTING TWO FABRIC PIECES, AND SEAM OF TWO FABRIC PIECES

(75) Inventor: Mirco Pellegrini, Tione di Trento (IT)

(73) Assignee: Novurania S.p.A., Tione di Trento (IT)

( * ) Notice: Subject to any disclaimer, the term of this patent is extended or adjusted under 35 U.S.C. 154(b) by 629 days.

(21) Appl. No.: 12/373,836

(22) PCT Filed: Jul. 17, 2007

(86) PCT No.: PCT/EP2007/006332
§ 371 (c)(1),
(2), (4) Date: Jan. 14, 2009

(87) PCT Pub. No.: WO2008/009420
PCT Pub. Date: Jan. 24, 2008

(65) Prior Publication Data
US 2009/0280284 A1    Nov. 12, 2009

(30) Foreign Application Priority Data
Jul. 17, 2006  (DE) .......................... 10 2006 032 963

(51) Int. Cl.
*B32B 3/10* (2006.01)
(52) U.S. Cl. ........... 428/61; 428/57; 428/58; 156/304.4; 156/304.6
(58) Field of Classification Search .................... 428/57, 428/58, 60, 61; 156/304.1, 304.3, 304.4, 156/304.5, 304.6
See application file for complete search history.

(56) References Cited

U.S. PATENT DOCUMENTS
| | | | |
|---|---|---|---|
| 4,083,070 A | 4/1978 | Martin | |
| 4,447,488 A | 5/1984 | Simm et al. | |

FOREIGN PATENT DOCUMENTS
| | | |
|---|---|---|
| DE | 26 29 907 | 7/1976 |
| DE | 29 22 089 A1 | 5/1979 |
| DE | 198 08 737 A1 | 3/1998 |
| DE | 100 38 312 A1 | 2/2002 |
| GB | 979829 A | 1/1965 |
| JP | 59-033375 | 2/1984 |

*Primary Examiner* — Alexander Thomas
(74) *Attorney, Agent, or Firm* — Scully, Scott, Murphy & Presser, PC

(57) ABSTRACT

The invention relates to a method for connecting two fabric pieces (11, 12). Said method comprises the following steps: a) two fabric pieces (11, 12) are joined together at a joint (18), said fabric pieces (11, 12) being provided with an elastomer coating on one side (11*a*, 12*a*) and a thermoplastic coating on a second side (11*b*, 12*b*); b) the joint (18) is covered on the first side (11*a*, 12*a*) of the fabric pieces (11, 12) by means of a first seam strip (15) that is provided with an elastomer coating on the side (15*a*) facing the fabric pieces (11, 12), while the joint (18) is covered on the second side (11*b*, 12*b*) of the fabric pieces (11, 12) by means of a second seam strip (16) that has a thermoplastic coating on the side (16*b*) facing the fabric pieces (11, 12); c) the fabric pieces (11, 12) are connected to the first seam strip (15) by curing at least one of the elastomer coatings, and the fabric pieces (11, 12) are connected to the second seam strip (16) by treating the thermoplastic coatings. The invention further relates to a seam (20) of two fabric pieces (11, 12).

22 Claims, 7 Drawing Sheets

PROCESS FOR CONNECTING TWO FABRIC PIECES, AND SEAM OF TWO FABRIC PIECES

BACKGROUND

The present invention relates to a process for connecting two fabric pieces and also to a seam of two fabric pieces.

For the purpose of producing floating bodies that are capable of being filled with air—for example, RIBs (Rigid Inflatable Boats), inflatable dinghies with a rigid keel, motorisable inflatable dinghies or generally larger inflatable dinghies of varying type—several fabric pieces are assembled to form the floating body. In this connection it is particularly important that the fabric pieces are firmly and tightly connected to one another at the joints, and that the seam exhibits the same mechanical strength as the fabric pieces. By way of material for the floating bodies, use is made of fabric that has been provided with a coating. Depending on the differing possible coatings that are used, differing manufacturing techniques are used for the purpose of connecting the fabric pieces.

A first possibility is the use of a fabric that has been provided with polyvinyl chloride (PVC), polyurethane or another thermoplastic coating. Connection of the fabric pieces is effected in this case by welding, which is undertaken by means of high frequency (HF) or by means of heat and, where appropriate, pressure. A second possibility is the use of fabric with unvulcanised elastomer coatings, in which case the fabric pieces are then fully connected to one another by means of vulcanisation of the elastomer coating. A third possibility consists in the use of fabric with an already vulcanised elastomer coating which is cold-bonded.

FIG. 1a shows a first possibility of how two fabric pieces can be connected to one another by means of the aforementioned manufacturing techniques and coatings. In this case a first fabric piece 1 is arranged overlapping with a second fabric piece 2. On the surfaces 7 of the fabric pieces 1, 2 there is located—depending upon the manufacturing technique being used—a thermoplastic coating, an unvulcanised elastomer coating, or a vulcanised elastomer coating. By means of the aforementioned processes, the two fabric pieces 1, 2 are connected to one another at the place of overlap. In the case of the use of a fabric with a vulcanised elastomer coating, adhesive 4 is applied at the place of overlap of the fabric pieces 1, 2.

FIG. 1b shows another possibility of the connection of two fabric pieces. In this case a first fabric piece 1 and a second fabric piece 2 are connected to one another on a part of the fabric surface, so that the two fabric pieces represent a T-shaped connection. On the side at which the fabric pieces 1, 2 gape apart, a seam tape 5 is provided. This seam tape 5 serves primarily for preventing an opening or gaping of the fabric pieces 1, 2. In general, seam tapes serve for protecting the seam and/or as a force-transmission element. Inseam tapes serve, in particular, for ensuring that air does not penetrate into the fibrils of the fabric and is consequently able, in effect, to find a channel to the outside. Outseam tapes serve, in particular, for ensuring that water does not penetrate from outside into the fibrils of the fabric as a result of wicking, consequently changing the adhesion of the coating adversely in the course of time. The surfaces 7 of the fabric pieces 1, 2 and the surface 7 of the seam tape 5 are provided with a thermoplastic, a vulcanised or an unvulcanised elastomer coating, so that—depending upon the manufacturing technique—the fabric pieces 1, 2 and the seam tape 5 can be connected to one another. In the case of the use of a fabric with a vulcanised elastomer coating, adhesive 4 may have been applied at the points of contact between the fabric pieces 1, 2 and the seam tape 5.

A disadvantageous aspect of such a seam is the fact that it can only be repaired with difficulty in the event of damage, and it is not aesthetic.

FIG. 2 shows another possibility of the connection of two fabric pieces using the methods stated above. In this case a first fabric piece 1 is arranged overlapping with a second fabric piece 2. On both sides of the places of overlap a seam tape 5, 6 is provided. Connection of the two fabric pieces 1, 2 and also of the seam tapes 5, 6 is effected in this case in a manner depending on the coating that is used on the surfaces 7. In the case of the use of a fabric with a vulcanised elastomer coating, adhesive 4 is applied onto the points of contact between the fabric pieces 1, 2 and the seam tapes 5, 6.

FIGS. 3a and 3b show the connection of two fabric pieces 1, 2 using only one seam tape 5, 6, respectively.

FIG. 4 shows the connection of two fabric pieces 1, 2 in a head seam. In this case the fabric pieces 1, 2 are arranged in such a way that they abut at their edges. On each of the two sides of the fabric pieces 1, 2 a seam tape 5 and 6, respectively, is provided. The fabric pieces 1, 2 and seam tapes 5, 6 are provided on their surfaces 7 with a coating, so that by means of the aforementioned processes the fabric pieces 1, 2 can be connected to the seam tapes 5, 6.

However, the processes that have been described exhibit various disadvantages. Fabric that is provided with a thermoplastic coating does not exhibit the ageing characteristics and resistance to weathering of fabric that exhibits an elastomer coating. In particular, polyvinyl chloride (PVC) easily becomes fragile and brittle as a result of the loss of the plasticisers. Polyurethane and other thermoplastics do not exhibit any colour stability or resistance to hydrolysis.

A disadvantageous aspect in the case of fabric with an unvulcanised elastomer coating is a very elaborate production process. Shaping is effected by applying the out of unvulcanised elastomeric-coated fabric onto predetermined moulds and by subsequent vulcanisation, as a result of which, on account of the use of certain predetermined shapes, no modification or personalisation of the shape is possible. Another disadvantage of fabric with an unvulcanised elastomer coating is that the fabric is very sensitive and can easily be damaged.

Fabric with a vulcanised elastomer coating is connected together by bonding. For this purpose, the surface to be bonded have to be roughened and coated with solvent-containing adhesive. This manufacture is very time-consuming and unecological, since the solvent has to evaporate completely prior to closure of the seam.

SUMMARY

It is therefore the object of the present invention to make available a process for connecting two fabric pieces, and also a seam of two fabric pieces, in which process the manufacture is ecological and simple, and as a result of which a durable connection of two fabric pieces is made possible without negative ageing phenomena.

According to the present invention, a process is claimed for connecting two fabric pieces, comprising the following steps:
 a) joining two fabric pieces at a joint, the fabric pieces exhibiting an elastomer coating on a first side and a thermoplastic coating on a second side, b) covering the joint on the first side of the fabric pieces by means of a first seam tape, the first seam tape exhibiting an elastomer coating on the side facing towards the fabric pieces and covering the joint on the second side of the fabric pieces by means of a second seam tape, the second seam tape exhibiting a thermoplastic coating on the side facing towards the fabric pieces, c) connecting the fabric pieces to the first seam tape by means of vulcanisation of at least one of the elastomer coatings and connecting the fabric pieces to the second seam tape by means of treatment of the thermoplastic coatings.

According to the present invention, furthermore a seam of two fabric pieces is claimed, comprising two fabric pieces joined to one another at a joint, the fabric pieces exhibiting an elastomer coating on a first side and a thermoplastic coating on a second side, a first seam tape covering the joint on the first side of the fabric pieces, the first seam tape exhibiting an elastomer coating on the side facing towards the fabric pieces, a second seam tape covering the joint on the second side of the fabric pieces, the second seam tape exhibiting a thermoplastic coating on the side facing towards the fabric pieces, the fabric pieces being capable of being connected to the first seam tape by means of vulcanisation of at least one of the elastomer coatings, and the fabric pieces being capable of being connected to the second seam tape by means of treatment of the thermoplastic coatings.

Through the use of two bonding techniques for the purpose of connecting the fabric pieces, a simple manufacture is made possible, and also a durable connection of the fabric pieces without exhibiting ageing. By virtue of the connection of the two fabric pieces to the first seam tape by an elastomer coating on the first side of the fabric pieces and on the side of the first seam tape facing towards the fabric pieces, a durable connection of the fabric pieces is made possible that exhibits no ageing characteristics and a high resistance to weathering. On the other hand, through the use of thermoplastic coatings on the second side of the fabric pieces and on the side of the second seam tape facing towards the fabric pieces, the fabric pieces are prevented from forming undesirable permanent creases prior to establishment of the connection. The use of vulcanised elastomers results in the desired elasticity and attaining of the definitive shaping only after the connection has been made, so that the use of unvulcanised elastomers is made possible, at least partially. Furthermore, through use of the manufacturing techniques for connecting thermoplastic coatings and also by means of the vulcanisation, a solvent-free and hence ecological connection is also made possible.

The elastomer coating on the first side of the fabric pieces is preferably vulcanised.

Furthermore, the elastomer coating of the first seam tape is preferably unvulcanised.

The fabric pieces are preferably connected to the first seam tape by means of vulcanisation of the elastomer coating of the first seam tape. In a particularly preferred embodiment, the first side of the fabric pieces and/or the side of the first seam tape facing towards the fabric pieces is/are coated with chlorosulfonated polyethylene.

Treatment of the thermoplastic coating can be effected by means of heating.

Heating of the thermoplastic coating can be effected under pressure.

The thermoplastic coating of the second side of the fabric pieces is preferably made of polyvinyl chloride or polyurethane.

The thermoplastic coating of the side of the second seam tape facing towards the fabric pieces is preferably polyvinyl chloride or polyurethane.

In a preferred embodiment, the side of the first seam tape facing away from the fabric pieces exhibits a vulcanised elastomer coating.

The side of the second seam tape facing away from the fabric pieces may exhibit a thermoplastic coating.

The fabric pieces and the seam tapes are preferably each textile-reinforced.

In a preferred embodiment, the edges of the fabric pieces are arranged alongside one another.

In another embodiment, the edges of the fabric pieces are arranged in overlapping manner.

BRIEF DESCRIPTION OF THE DRAWINGS

The invention will be elucidated in more detail in the following on the basis of Figures. Shown therein are.

DETAILED DESCRIPTION OF EXEMPLARY EMBODIMENTS

Figure 1A:
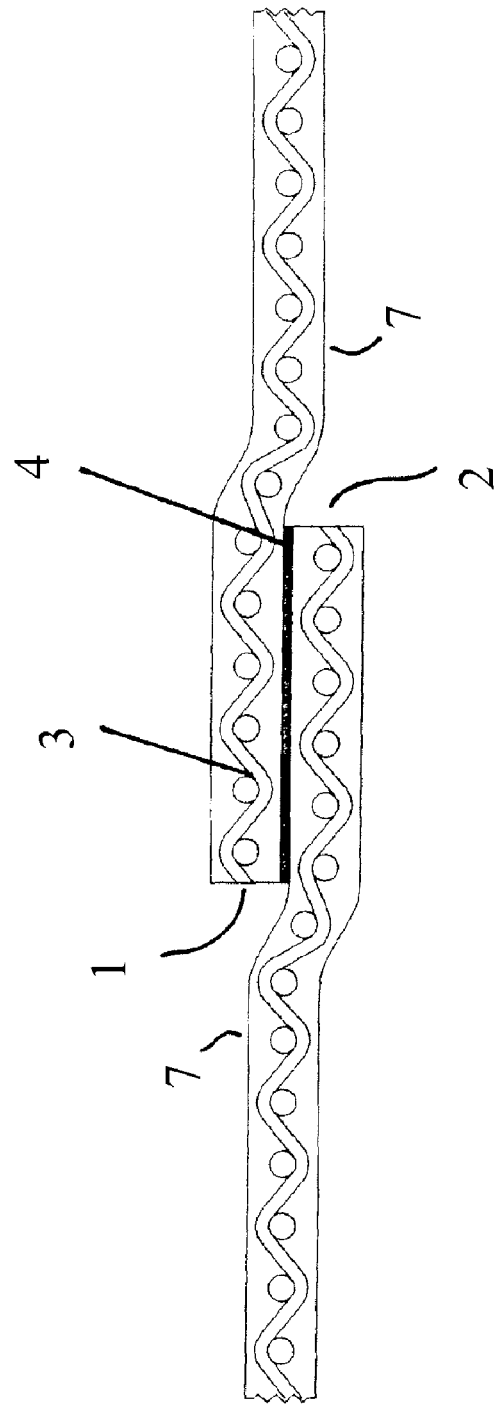
FIG. 1a a first type of connection of two fabric pieces according to the prior art, FIG. 1b a second type of connection of two fabric pieces according to the prior art, FIG. 2 a third type of connection of two fabric pieces according to the prior art, FIGS. 3a and 3b a fourth and a fifth type of connection of two fabric pieces according to the prior art, FIG. 4 a sixth type of connection of two fabric pieces according to the prior art, FIG. 5 the connection of two fabric pieces according to the present invention and FIG. 6 a floating body, capable of being filled with air, with a seam according to the invention.
Figure 1B:
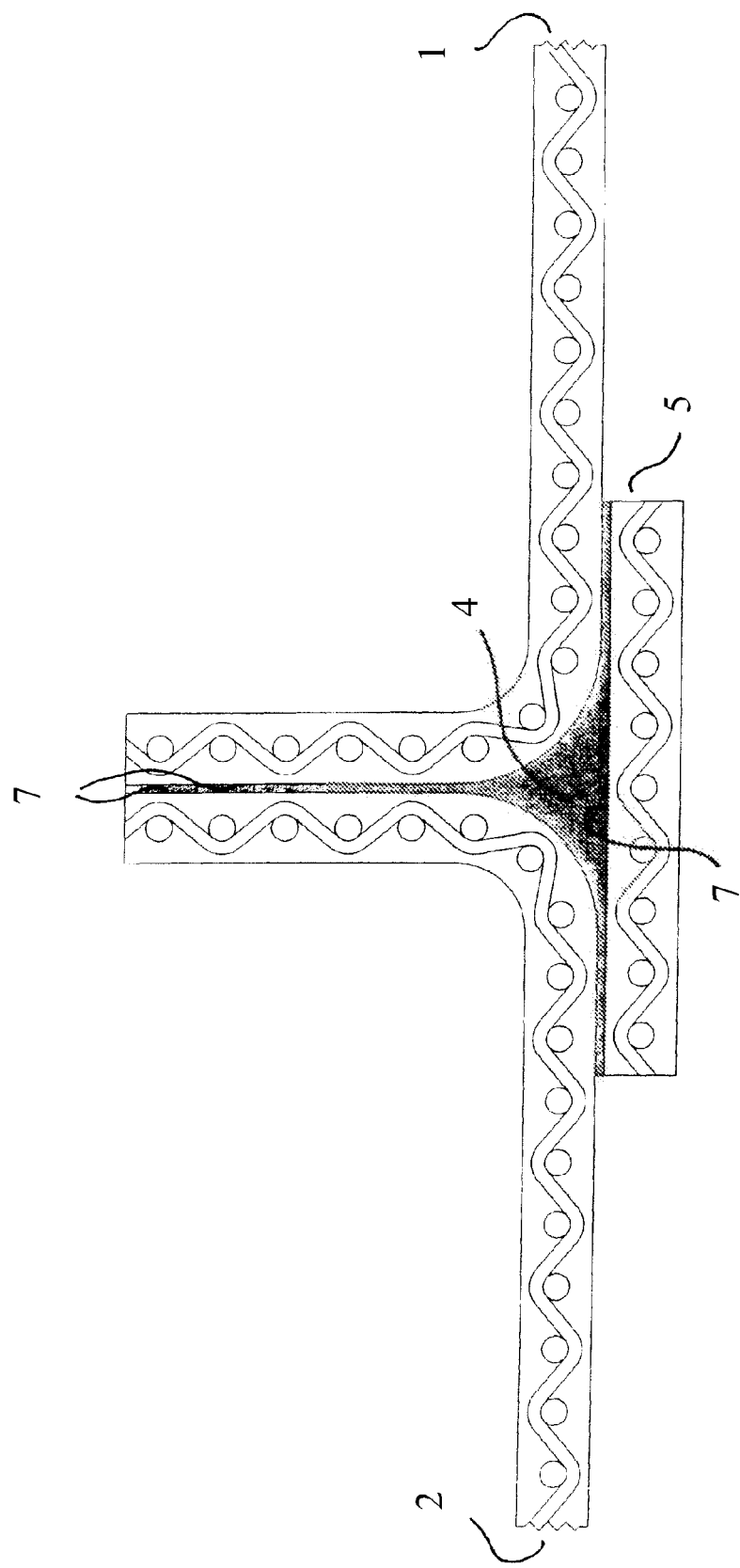
Figure 2:
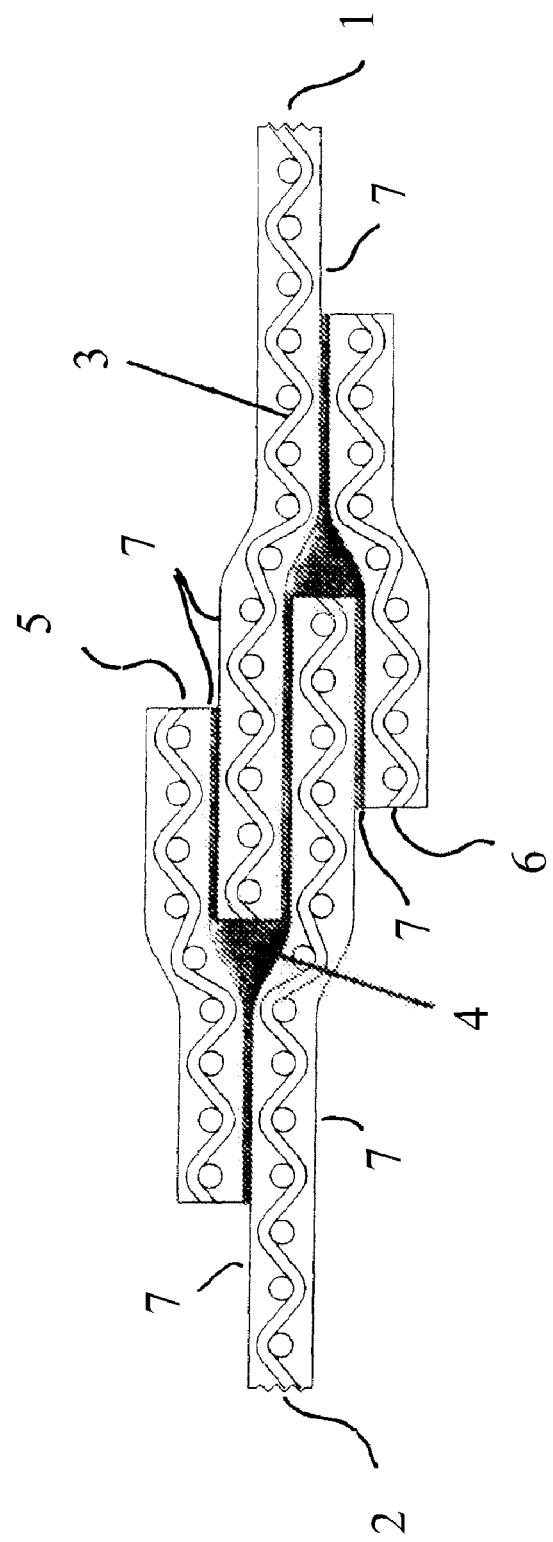
Figure 3A:
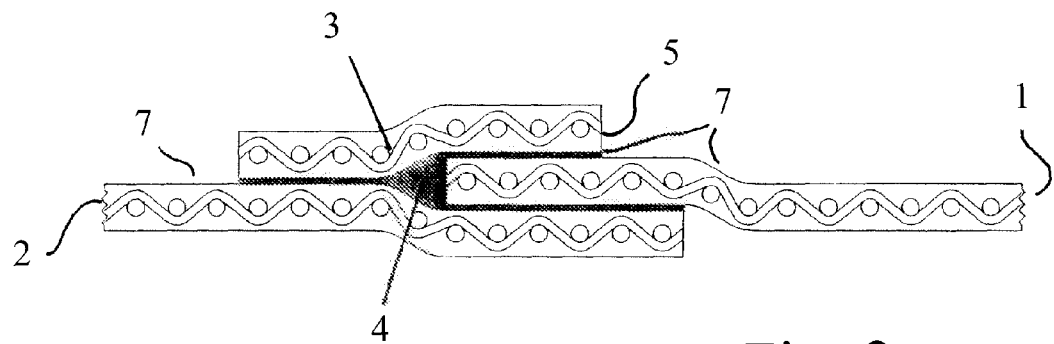
Figure 3B:
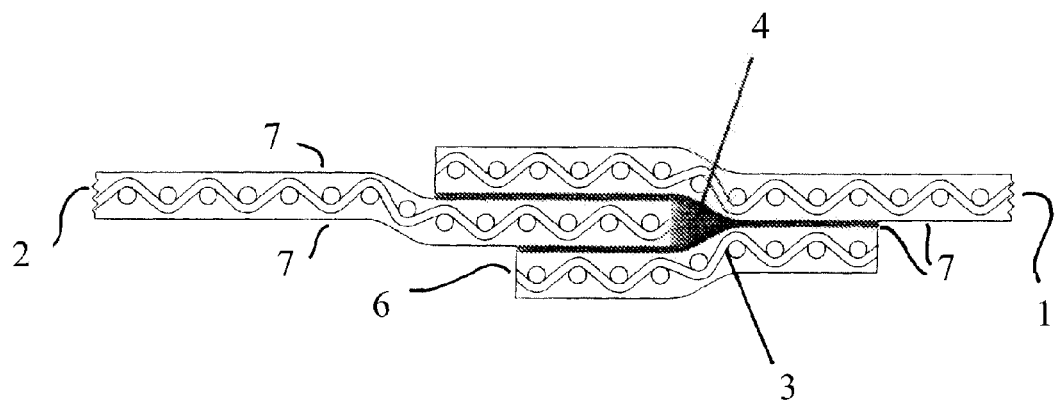
Figure 4:
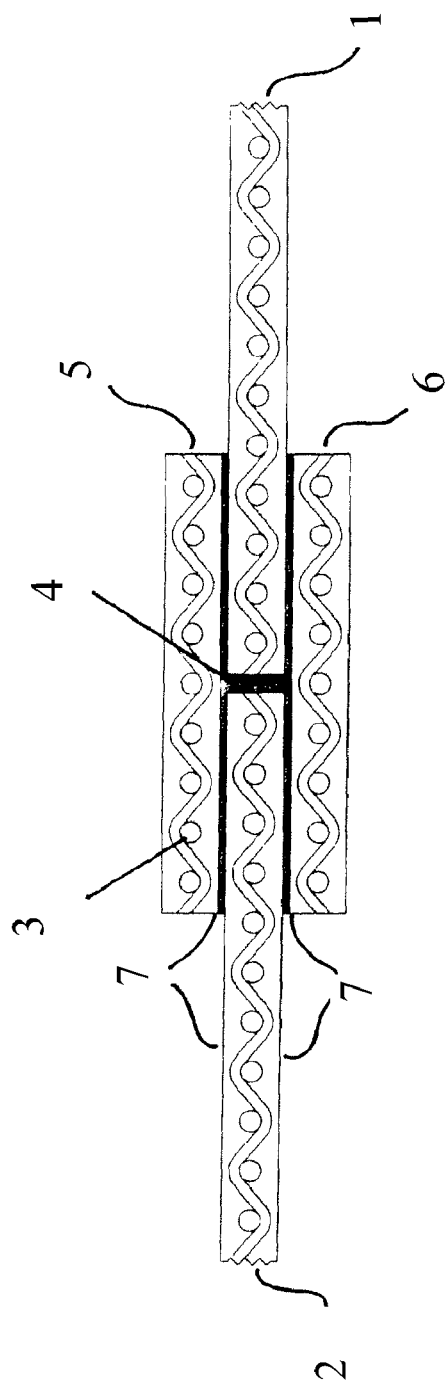
Figure 5:
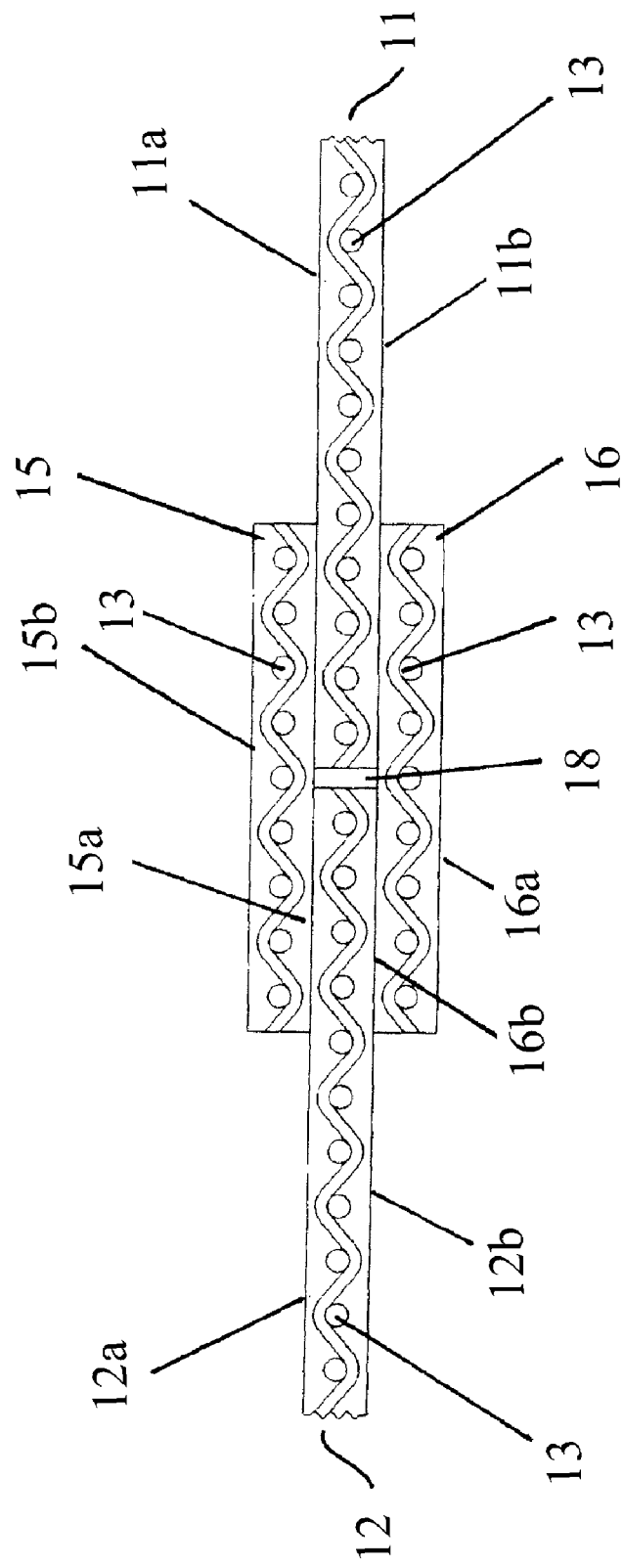

FIG. 5 shows the seam of two fabric pieces 11, 12 according to the present invention, such as is provided for the purpose of assembling individual fabric pieces 11, 12 for the purpose of producing a floating body that is capable of being filled with air. The two fabric pieces 11, 12 in this case can be cut in such a way that they abut at their edges. Alternatively, the two fabric pieces 11, 12 may also be arranged in overlapping manner, as is known from the prior art according to FIGS. 1a, 2, 3a and 3b. An advantageous aspect of each of these seam arrangements is the fact that the seam can be easily and durably repaired in the event of damage. The first side 11a, 12a of the fabric pieces 11, 12 in this case is provided with an elastomer coating and points in the direction of the outside of the floating body which is capable of being filled with air. The second side 11b, 12b of the fabric pieces 11, 12 exhibits a thermoplastic coating and points in the direction of the interior of the floating body which is capable of being filled with air or which is filled with air.

Onto the first side 11a, 12a of the fabric pieces 11, 12 a first seam tape 15 is applied which, besides serving for stabilisation of the seam and for transmission of force 4, also serves as protection of the seam against contamination and against infiltration of water. Onto the second side 11b, 12b of the fabric pieces 11, 12 a second seam tape 16 is applied which likewise serves for stabilisation of the seam and for transmission of force between the fabric pieces 11 and 12.

In this case, either the elastomer coating of the first side 11a, 12a of the fabric pieces 11, 12 or the elastomer coating of the side 15a of the first seam tape 15 facing towards the fabric pieces 11, 12, or both of the said elastomer coatings, is/are made of unvulcanised elastomer. In a preferred embodiment, the elastomer coating on the first side 11a, 12a of the fabric pieces 11, 12 is vulcanised. By virtue of the resulting elasticity, crease formation prior to establish the connection is avoided, and shaping of the seam is effected only after the connection of the fabric pieces 11, 12 to the seam tapes 15, 16. The elastomer coating of the first side 11a, 12a of the fabric pieces 11, 12 and/or of the side 15a of the first seam tape 15 facing towards the fabric pieces 11, 12 consist(s) in this case of chlorosulfonated polyethylene (Hypalon®). Through the use of chlorosulfonated polyethylene (Hypalon®), a colour stability and good resistance to hydrolysis of the coating are ensured. Furthermore, chlorosulfonated polyethylene offers the advantage that, with this material, water and moisture serve as catalysts and enable the vulcanisation and hence complete crosslinking of the elastomer coatings in the course of time even without heat, this being a great advantage particularly in the case of floating bodies, which constantly come into contact with water and moisture.

The side 16b of the second seam tape 16 facing towards the fabric pieces 11, 12 likewise exhibits a thermoplastic coating. The thermoplastic coating of the second side 11b, 12b of the fabric pieces 11, 12 and the side 16b of the second seam tape 16 facing towards the fabric pieces 11, 12 preferably consist of polyvinyl chloride (PVC), polyurethane or other thermoplastics.

For the purpose of connecting the fabric pieces 11, 12 which abut one another at a joint 18 or, in the case of overlapping, which overlap there, the first seam tape 15 is applied onto the joint 18 on the first side 11a, 12a of the fabric pieces 11, 12, and the second seam tape 16 is applied onto the joint 18 on the second side 11b, 12b of the fabric pieces 11, 12. The connection of the first seam tape 15 to the first side 11a, 12a of the fabric pieces 11, 12 is effected by vulcanisation of the not yet vulcanised elastomer coating. In the case where none of the coatings on the first side 11a, 12a of the fabric pieces or on the side 15a of the seam tape 15 facing towards the fabric pieces 11, 12 is vulcanised, vulcanisation of all the elastomer coatings is effected. If only one of the stated coatings is unvulcanised, a vulcanisation of the unvulcanised layer onto the vulcanised layer is effected.

The second seam tape 16 is connected to the second side 11b, 12b of the fabric pieces 11, 12 by means of suitable treatment, for example by the thermoplastic coatings being welded by means of high frequency (HF) or heat and, where appropriate, pressure.

The use of an already completely vulcanised elastomer coating on the first side 11a, 12a of the fabric pieces 11, 12 has the advantage that the coated fabric is not sensitive and cannot be damaged so easily. The side 15b of the seam tape 15 facing away from the fabric pieces 11, 12 preferably exhibits the same elastomer coating as the first side 11a, 12a of the fabric pieces 11, 12, in order to obtain a visually appealing impression. In another embodiment, the side 15b of the first seam tape 15 facing away from the fabric pieces 11, 12 exhibits a coating differing from that exhibited by the first side 11a, 12a of the fabric pieces 11, 12, the coating of the side 15b of the first seam tape 15 facing away from the fabric pieces 11, 12 being, however, chosen in such a way that it matches the coating of the first side 11a, 12a of the fabric pieces well visually. The side 16a of the seam tape 16 facing away from the fabric pieces exhibits a thermoplastic coating or another type of coating.

The fabric pieces and the seam are in this case assembled to form a floating body in such a way that the first side of the fabric pieces and also the first seam tape 15 are situated on the outside of the floating body, and the second side 11b, 12b of the fabric pieces 11, 12 and also the second seam tape 16 are situated on the inside of the floating body and hence point towards the air-fillable space.

For the purpose of mechanical stabilisation, the first seam tape 15, the second seam tape 16 or both is/are textile-reinforced with a fabric that exhibits the same tear resistance and stretch resistance as the fabric of the fabric pieces 11, 12. Hence the seam tapes 15, 16 serve as a force-transmitting element.

Figure 6:
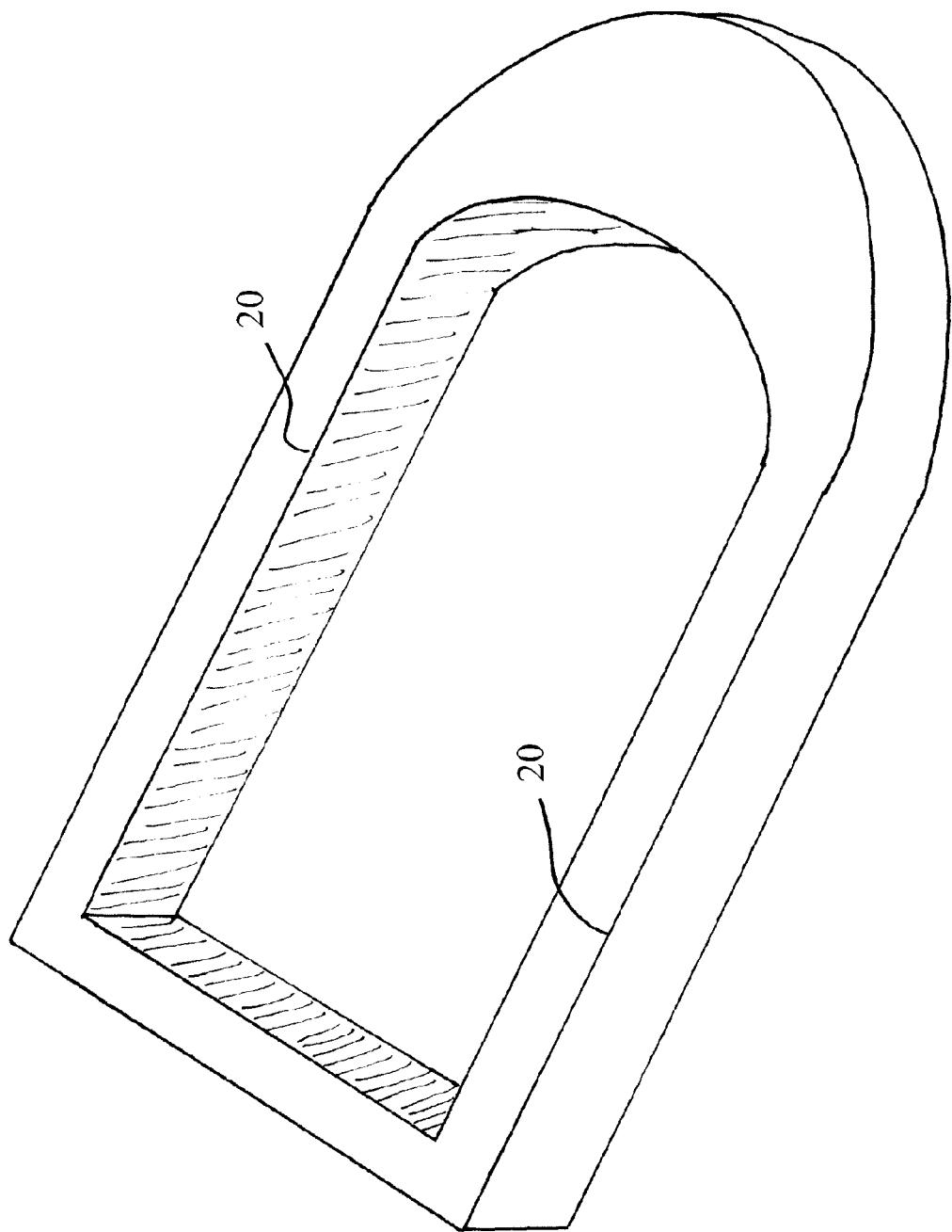

FIG. 6 shows a floating body 21 which is capable of being filled with air, for example a RIB (Rigid Inflatable Boat), an inflatable dinghy with a solid hull, a motorisable inflatable dinghy or generally a larger inflatable dinghy of a different type, with several seams 20 according to the present invention.

A seam according to the present invention is not restricted to floating bodies but can be used in the connection of any type of fabric pieces to the corresponding coatings.

The invention claimed is:

1. A process for connecting two fabric pieces, comprising the following steps:
    joining two fabric pieces at a joint, the fabric pieces comprising an elastomer coating on a first side and a thermoplastic coating on a second side,
    covering the joint on the first side of the fabric pieces by means of a first seam tape, the first seam tape comprising an elastomer coating on the side facing towards the fabric pieces and covering the joint on the second side of the fabric pieces by means of a second seam tape, the second seam tape comprising a thermoplastic coating on the side facing towards the fabric pieces, and
    connecting the fabric pieces to the first seam tape by means of vulcanisation of at least one of the elastomer coatings and connecting the fabric pieces to the second seam tape by means of treatment of the thermoplastic coatings.

2. The process according to claim 1, wherein the elastomer coating on the first side of the fabric pieces is vulcanised.

3. The process according to claim 1, wherein the elastomer coating of the first seam tape is unvulcanised.

4. The process according to claim 3, wherein the elastomer coating of the first seam tape consists of chlorosulfonated polyethylene.

5. The process according to claim 1, wherein, in the step of connecting, the connection of the fabric pieces to the first seam tape is effected by means of vulcanisation of the elastomer coating of the first seam tape.

6. The process according to claim 1, wherein, in the step of connecting, the treatment of the thermoplastic coatings is effected by means of heating.

7. The process according to claim 6, wherein, in the step of connecting, the heating of the thermoplastic coatings is effected under pressure.

8. A seam of two fabric pieces, comprising:
    two fabric pieces joined to one another at a joint, the fabric pieces comprising an elastomer coating on a first side and a thermoplastic coating on a second side,
    a first seam tape covering the joint on the first side of the fabric pieces, the first seam tape comprising an elastomer coating on the side facing towards the fabric pieces,
    a second seam tape covering the joint on the second side of the fabric pieces, the second seam tape comprising a thermoplastic coating on the side facing towards the fabric pieces,
    wherein the fabric pieces are connected to the first seam tape by means of vulcanisation of at least one of the elastomer coatings, and the fabric pieces are capable of being connected to the second seam tape by means of treatment of the thermoplastic coatings.

9. The seam according to claim 8, wherein the first side of the fabric pieces is coated with a completely vulcanised elastomer.

10. The seam according to claim 8, wherein the side of the first seam tape facing towards the fabric pieces is coated with an unvulcanised elastomer.

11. The seam according to claim 10, wherein the fabric pieces are connected to the first seam tape by means of vulcanisation of the elastomer coating of the first seam tape.

12. The seam according to claim 8, wherein the first side of the fabric pieces and/or the side of the first seam tape facing towards the fabric pieces is/are coated with chlorosulfonated polyethylene.

13. The seam according to claim 8, wherein the treatment of the thermoplastic coatings is effected by means of heating.

14. The seam according to claim 13, wherein the heating of the thermoplastic coating is effected under pressure.

15. The seam according to claim 8, wherein the thermoplastic coating of the second side of the fabric pieces comprises polyvinyl chloride or polyurethane.

16. The seam according to claim 8, wherein the thermoplastic coating of the side of the second seam tape facing towards the fabric pieces comprises polyvinyl chloride or polyurethane.

17. The seam according to claim 8, wherein the side of the first seam tape facing towards the fabric pieces comprises a vulcanised elastomer coating.

18. The seam according to claim 8, wherein the side of the second seam tape facing towards the fabric pieces comprises a thermoplastic coating.

19. The seam according to claim 8, wherein the seam tapes are each textile-reinforced.

20. The seam according to claim 8, wherein the edges of the fabric pieces are arranged alongside one another.

21. The seam according to claim 8, wherein the edges of the fabric pieces are arranged in overlapping manner.

22. A floating body that is capable of being filled with air, comprising at least one seam according to claim 8.

* * * * *